(12) United States Patent
Dang et al.

(10) Patent No.: US 10,176,340 B2
(45) Date of Patent: Jan. 8, 2019

(54) ABSTRACTED GRAPHS FROM SOCIAL RELATIONSHIP GRAPH

(71) Applicant: Dataspark Pte, Ltd., Singapore (SG)

(72) Inventors: The Anh Dang, Singapore (SG); Amy Xuemei Shi-Nash, Singapore (SG)

(73) Assignee: DataSpark, Pte. Ltd., Singapore (SG)

( * ) Notice: Subject to any disclaimer, the term of this patent is extended or adjusted under 35 U.S.C. 154(b) by 62 days.

(21) Appl. No.: 15/068,622

(22) Filed: Mar. 13, 2016

(65) Prior Publication Data
US 2017/0262653 A1 Sep. 14, 2017

(51) Int. Cl.
*G06F 21/62* (2013.01)
*G06F 17/30* (2006.01)

(52) U.S. Cl.
CPC ...... *G06F 21/6254* (2013.01); *G06F 17/3087* (2013.01); *G06F 17/30958* (2013.01)

(58) Field of Classification Search
USPC ........................................................ 726/28
See application file for complete search history.

(56) References Cited

U.S. PATENT DOCUMENTS

| | | | |
|---|---|---|---|
| 3,057,726 A | 10/1962 | Teignmouth | |
| 3,102,813 A | 9/1963 | Teignmouth et al. | |
| 3,984,326 A | 10/1976 | Bendel | |
| 4,552,060 A | 11/1985 | Redl et al. | |
| 5,906,151 A | 5/1999 | Firestone et al. | |
| 6,744,383 B1 | 6/2004 | Alfred et al. | |
| 6,882,930 B2 | 4/2005 | Trayford et al. | |
| 7,161,497 B2 | 1/2007 | Gueziec | |
| 7,221,287 B2 | 5/2007 | Gueziec et al. | |
| 7,765,176 B2 | 7/2010 | Simmons et al. | |
| 8,046,319 B2 | 10/2011 | Satir et al. | |
| 8,214,883 B2* | 7/2012 | Obasanjo | G06Q 10/107 726/4 |
| 8,331,936 B2 | 12/2012 | Alonso-Rubio et al. | |
| 8,386,495 B1 | 2/2013 | Sandler et al. | |
| 8,423,494 B2 | 4/2013 | Barrett et al. | |
| 8,446,842 B2* | 5/2013 | Cao | G06F 17/30477 370/254 |
| 8,478,512 B2 | 7/2013 | Nortrup | |
| 8,583,659 B1* | 11/2013 | Alexandrescu | G06F 17/3053 707/705 |

(Continued)

*Primary Examiner* — Taghi T Arani
*Assistant Examiner* — BadriNarayanan C
(74) *Attorney, Agent, or Firm* — Russell S. Krajec; Krajec Patent Offices, LLC

(57) ABSTRACT

A system may generate abstracted graphs from a social relationship graph in response to a query. A query may identify a person for which permission has been obtains to collect their data. The abstracted graphs may include summary statistics for various relationships of the person. The relationships may include other persons, places, things, concepts, brands, or other object that may be present in a social relationship graph, and the relationships may be presented in an abstracted or summarized form. The abstracted form may preserve data that may be useful for the requestor, yet may prevent the requestor from receiving some raw data. When two or more people have given consent, the data relating to the consenting persons may be presented in a non-abstracted manner, while other data may be presented in an abstracted manner.

14 Claims, 5 Drawing Sheets

100
REQUEST FOR PROFILE WITHIN SOCIAL GRAPH

(56) References Cited

U.S. PATENT DOCUMENTS

| | | | |
|---|---|---|---|
| 8,639,756 B2* | 1/2014 | Bostrom | G06Q 10/10 709/204 |
| 8,666,643 B2 | 3/2014 | McBride et al. | |
| 8,693,458 B2 | 4/2014 | Smartt et al. | |
| 8,725,796 B2* | 5/2014 | Serena | G06Q 10/10 709/203 |
| 8,731,835 B2 | 5/2014 | Chidlovskii et al. | |
| 8,739,016 B1* | 5/2014 | Goldman | G06Q 50/01 715/200 |
| 8,799,461 B2 | 8/2014 | Herz et al. | |
| 8,805,605 B2 | 8/2014 | Cooper et al. | |
| 8,819,009 B2* | 8/2014 | Wana | G06F 17/3089 707/734 |
| 8,825,350 B1 | 9/2014 | Robinson | |
| 8,849,823 B2* | 9/2014 | Gotz | G06T 11/206 707/736 |
| 8,868,340 B1 | 10/2014 | Rinckes et al. | |
| 8,938,500 B1* | 1/2015 | Acharya | G06Q 50/01 705/319 |
| 9,008,933 B2 | 4/2015 | Cooper et al. | |
| 9,141,656 B1* | 9/2015 | Lopyrev | G06F 17/30321 |
| 9,165,304 B2 | 10/2015 | Weiss et al. | |
| 9,195,722 B1 | 11/2015 | Liu et al. | |
| 9,196,157 B2 | 11/2015 | Hardin et al. | |
| 9,494,694 B1 | 11/2016 | Dong et al. | |
| 9,589,303 B2* | 3/2017 | Belov | G06F 17/30864 |
| 9,754,485 B2 | 9/2017 | Holleczek et al. | |
| 2004/0030670 A1 | 2/2004 | Barton | |
| 2004/0058678 A1 | 3/2004 | deTorbal | |
| 2005/0114383 A1 | 5/2005 | Beringer et al. | |
| 2006/0074545 A1 | 4/2006 | Kim | |
| 2007/0088490 A1 | 4/2007 | Sutardja | |
| 2007/0208497 A1 | 9/2007 | Downs et al. | |
| 2008/0004789 A1 | 1/2008 | Horvitz et al. | |
| 2008/0188242 A1 | 8/2008 | Carlson et al. | |
| 2009/0216704 A1 | 8/2009 | Zheng et al. | |
| 2010/0007552 A1 | 1/2010 | Oda et al. | |
| 2011/0099046 A1 | 4/2011 | Weiss et al. | |
| 2011/0099047 A1 | 4/2011 | Weiss et al. | |
| 2011/0099048 A1 | 4/2011 | Weiss et al. | |
| 2011/0145262 A1 | 6/2011 | Jamjoom et al. | |
| 2011/0173261 A1* | 7/2011 | McCallie, Jr. | G06F 21/6245 709/204 |
| 2011/0176523 A1 | 7/2011 | Huang et al. | |
| 2011/0310733 A1 | 12/2011 | Tzamaloukas et al. | |
| 2012/0096002 A1 | 4/2012 | Sheehan et al. | |
| 2012/0221231 A1 | 8/2012 | Nagata et al. | |
| 2012/0226522 A1 | 9/2012 | Weiss et al. | |
| 2012/0245881 A1 | 9/2012 | Takaoka | |
| 2012/0266081 A1* | 10/2012 | Kao | G06Q 50/01 715/751 |
| 2012/0296885 A1 | 11/2012 | Gontmakher et al. | |
| 2013/0059607 A1 | 3/2013 | Herz et al. | |
| 2013/0066548 A1 | 3/2013 | Gruen et al. | |
| 2013/0073473 A1* | 3/2013 | Heath | G06Q 30/02 705/319 |
| 2013/0085659 A1 | 4/2013 | Bekaert | |
| 2013/0103290 A1 | 4/2013 | Hardin et al. | |
| 2013/0170484 A1 | 7/2013 | Kang et al. | |
| 2013/0173633 A1 | 7/2013 | Piepgrass et al. | |
| 2013/0185189 A1* | 7/2013 | Stewart | G06Q 40/02 705/38 |
| 2013/0191325 A1 | 7/2013 | Hatami-Hanza | |
| 2013/0198188 A1 | 8/2013 | Huang et al. | |
| 2013/0204525 A1 | 8/2013 | Pfeifle | |
| 2013/0211706 A1 | 8/2013 | MacNaughtan et al. | |
| 2013/0260791 A1 | 10/2013 | Malinovskiy et al. | |
| 2014/0012498 A1 | 1/2014 | Gustafson | |
| 2014/0058913 A1* | 2/2014 | Hinesley | G06Q 40/06 705/35 |
| 2014/0088865 A1 | 3/2014 | Thies et al. | |
| 2014/0108308 A1* | 4/2014 | Stout | G06N 3/08 706/12 |
| 2014/0122043 A1 | 5/2014 | Bellamy et al. | |
| 2014/0149514 A1* | 5/2014 | Ryan | H04W 4/21 709/204 |
| 2014/0164390 A1 | 6/2014 | Hampapur et al. | |
| 2014/0189524 A1* | 7/2014 | Murarka | G06Q 50/01 715/744 |
| 2014/0189530 A1* | 7/2014 | Anand | H04L 65/403 715/753 |
| 2014/0200805 A1 | 7/2014 | Modica et al. | |
| 2014/0222321 A1 | 8/2014 | Petty et al. | |
| 2014/0244149 A1 | 8/2014 | Relyea et al. | |
| 2014/0244752 A1* | 8/2014 | Tseng | H04N 21/26291 709/204 |
| 2014/0330548 A1 | 11/2014 | Appel et al. | |
| 2014/0330819 A1 | 11/2014 | Raina et al. | |
| 2015/0006247 A1* | 1/2015 | Batra | G06Q 30/0201 705/7.29 |
| 2015/0065159 A1 | 3/2015 | Alpert et al. | |
| 2015/0148068 A1 | 5/2015 | Planas et al. | |
| 2015/0278375 A1* | 10/2015 | Kim | G06F 17/30867 707/734 |
| 2015/0285651 A1 | 10/2015 | Cerecke et al. | |
| 2015/0285656 A1 | 10/2015 | Verheyen et al. | |
| 2015/0348078 A1* | 12/2015 | Alsina | G06Q 30/0214 705/14.16 |
| 2015/0350890 A1 | 12/2015 | Arunkumar et al. | |
| 2015/0354973 A1 | 12/2015 | Wang et al. | |
| 2016/0021152 A1* | 1/2016 | Maguire | H04L 65/403 709/204 |
| 2016/0078365 A1 | 3/2016 | Baumard | |
| 2016/0327397 A1 | 11/2016 | Cordova et al. | |
| 2016/0371973 A1 | 12/2016 | Holleczek et al. | |
| 2017/0039602 A1 | 2/2017 | Shi-Nash et al. | |
| 2017/0171720 A1 | 6/2017 | Holleczek et al. | |
| 2017/0195854 A1 | 7/2017 | Shi-Nash et al. | |
| 2017/0212945 A1* | 7/2017 | Shankar | G06F 17/30581 |
| 2017/0262653 A1 | 9/2017 | Dang et al. | |
| 2017/0277767 A1 | 9/2017 | Dang et al. | |
| 2017/0277907 A1 | 9/2017 | Dang et al. | |

* cited by examiner

ABSTRACTED GRAPHS FROM SOCIAL RELATIONSHIP GRAPH

BACKGROUND

Social networks and other systems may develop a social relationship graph that describes the connections between people. In some social networks, the relationships may be explicit, where both parties may agree to share a relationship. In other networks, the relationships may be one-sided, where one party may connect or follow another party without the first party's permission or even knowledge.

Some social relationship graphs may be inferred or derived from various sources of data, including real estate transactions, census data, telecommunications network data, or other data.

Social relationship graphs may be useful in many business or social settings, but may contain private data that may or may not be permissible to share.

SUMMARY

A system may generate abstracted graphs from a social relationship graph in response to a query. A query may identify a person for which permission has been obtains to collect their data. The abstracted graphs may include summary statistics for various relationships of the person. The relationships may include other persons, places, things, concepts, brands, or other object that may be present in a social relationship graph, and the relationships may be presented in an abstracted or summarized form. The abstracted form may preserve data that may be useful for the requestor, yet may prevent the requestor from receiving some raw data. When two or more people have given consent, the data relating to the consenting persons may be presented in a non-abstracted manner, while other data may be presented in an abstracted manner.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Abstracted Graphs from Social Relationship Graph

Figure 1:
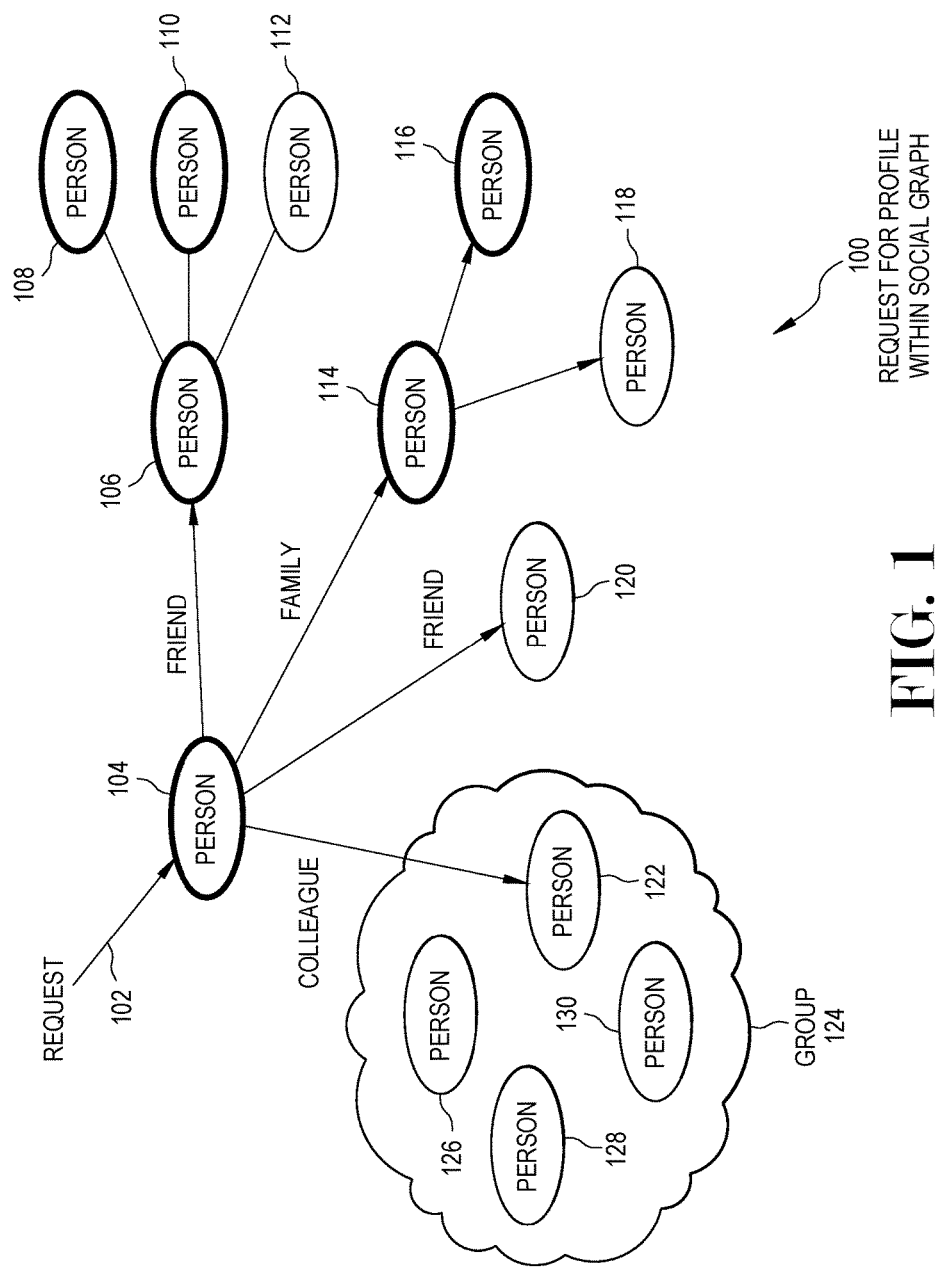
FIG. 1 is a diagram illustration of an embodiment showing a social graph and nodes within the social graph.

An abstracted graph may be presented to a requestor, where the abstracted graph may contain summary statistics for relationships that may be derived from a larger social relationship graph. The abstracted graph may contain useful data in a meaningful form, yet may preserve the confidentiality of specific relationships in the larger social relationship graph.

A social relationship graph may be constructed from many data sources, such as telecommunications network data, computerized social networks, public records, and other sources. In many cases, a social relationship graph may be created or augmented by secondary data sources, such as purchase activity provided by a retail outlet, ridership information obtained from a public transportation network, browsing habits received from a user's web searching history, or other sources.

A social relationship graph may contain a profile of a user that may contain personal details, such as their affinity to certain products and brands, their spending habits, and their general likes and dislikes. The social relationship graph may identify other people with whom the user associates on a business level, a recreational level, a personal friendship level, a family level, or some other type of relationship. From such connections, the user's likes and dislikes may be further strengthened or weakened.

A requestor may obtain permission from a first user to retrieve their information and may transmit a request to a social relationship graph manager. The request may include the type of data being requested and may specify the type of summary or analysis that may also be useful. In response, a summary graph of the first user may be generated from a social relationship graph.

The permission settings from users may change how the data may be aggregated and presented. When a user gives permission, actual details about their information may be presented, as well as for people within their social graph who have also given permission. When no permission or limited permission settings are encountered, the data representing those persons may be obscured, summarized, aggregated, or otherwise anonymized. In some cases, the data may be salted with random or false data to protect the details for which permissions may not have been obtained.

The summary graph may include the first user along with any other users for which permission may be given. Relationships between the users may be presented, along with summary statistics of data relevant to a requestor. The summary statistics may be useful for a requestor to make a determination for a particular user.

For example, an insurance company may submit a request for information relating to a potential customer. The insurance company may wish to use the results to determine an appropriate rate for an insurance product. A graph analyzer may receive the request and generate an abstracted or summarized graph that may represent the customer. The summarized graph may include various factors of interest to the insurance company, which may include the customer's associations with various people and organizations including family, employers, customers, friends, political and religious associations, nonprofit organizations, brands, advertisers, retail companies, and many other connections. Some of the relationships may be presented with identifying information when permission has been given, while other relationships may be summarized or obfuscated when permission is not available.

The summary statistics may include analysis or comparison of the customer's specific data to data derived from a large sample assimilated from the larger social relationship graph. For example, a person's affinity for a certain interest, such as football, may be presented as being in the top 10% of people in the same age group who have an affinity for football.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, Compact-Disk Read Only Memory (CD-ROM), digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100 showing a request for a profile from a social graph. Embodiment 100 is merely one simplified illustration of a request 102 that may identify a person 104 as a starting point for a truncated social graph.

A truncated social graph may have several uses. For example, a bank or insurance company may desire a risk analysis of a person, and may use the risk analysis to determine whether or not to loan money to or insure the person. The truncated social graph may show relevant information about the person that may be gleaned from a larger social graph. The truncated social graph may be analyzed by a requestor to get a more complete picture of a person of interest.

A truncated social graph may be culled from a larger social graph, and the truncated social graph may include nodes for which permission has been granted, as well as anonymized nodes and relationships that may represent data for which permission has not been granted. In general, the person of interest often gives permission for a requestor to get their graph, but other people within the graph may or may not give permission for such uses of their data. For those people for which permission is given, they may be represented in the truncated graph, and for those people for which no permission is given, the truncated graph may include anonymized nodes, summary nodes, or other representations of their data.

The data within a truncated social graph may include relationships of a person with other people. Each person may have relationships with various objects, such as places, things, brands, and other information, such as political party affiliation, hobbies or interests, religious affiliations, vacation and recreational preferences, health history, musical and literary preferences, and many more topics that may be gleaned from various sources.

A social graph may be represented in many different ways, and each graph may have different structures that may reflect the data it contains. In one such implementation, persons may be represented as person nodes, with relationships represented as edges having different classifications and strengths. In some cases, two people may have several relationships. For example, a father and son may be related by family, as well as by a business relationship when both the father and son do business together or with each other. The example of embodiment 100 may illustrate a graph that contains person to person relationship.

Some social graphs may represent affiliations with various other objects, such as locations, things, brands, and other descriptor objects. In some implementations, such objects may be represented as object nodes within a graph. In other implementations, such objects may be represented as a set of attributes or descriptors for each person node.

Some graphs may include nodes that may represent groups of people, such as corporations, religious or political institutions, recreational leagues or teams, or other groups. In many cases, such groups of people may have a set of attributes or descriptors that may be common to the people within the group. For example, a group that may represent a recreational soccer league may have attributes of health-consciousness, athleticism, or other such characteristics.

Social graphs may be built from multiple data sources. In some cases, people may associate with other people, institutions, brands, or other items using social networks, which may make some of their information public. In other cases, a social graph may be constructed using public records, such as home addresses, family relationships, ownership of real or personal property, employment records, or other data. In still other cases, a social graph may be created from a user's online behavior, such as their cellular telephone movements, browsing history, communications with other people, search history, and other information.

A social graph may be supplemented by various sources. For example, a cellular network provider may create a basic social network, but may supplement their network with public records. In many cases, a service provider may request and receive permission from users for their information to be tracked, and such information may become a part of a social graph.

Social graphs may attribute certain characteristics to a person based on their relationships and affiliations with other persons. For example, one person may have a very close relationship with another person who has shares a particular political view. While the first person's political affiliation may not be known directly, the affiliation may be assumed or implied based on their relationship with the second person. Such a principle may be one way that a truncated social graph may be more revealing and more accurate than having an assessment of an individual person.

Embodiment 100 may illustrate how a request may be analyzed within a social graph. A request 102 may identify a person 104. In a typical use case, the person 104 may give permission for the truncated social graph to be built and transmitted to a requestor. The entity that may have the underlying social graph may have large amounts of data for many people, some of the data may be private and the entity may not be allowed to share the data without user's permission. In some cases, various privacy laws may limit the data being collected and shared with third parties.

A third party may request the truncated social graph. The third party may present a request with an authorization from the person 104. In a use case with a bank or insurance company, the borrower or insured may be the person 104.

The person 104 may have a friend relationship with person 106, which may in turn have relationships with persons 108, 110, and 112. Person 104 may have a family relationship with person 114, which may have relationships with persons 116 and 118. Person 104 may have a colleague relationship with person 122, which may be part of a group 124. The group 124 may be made up of persons 126, 128, and 130.

In the example of embodiment 100, the persons illustrated with a heavy circle may have given permission for sharing their information, while those represented with light circles may not have given permission.

A truncated graph for person 104 may include nodes that may include information from all of the persons for which permission had been given, but may include anonymized, obfuscated, or summarized information for those people for whom no permission had been given.

A truncated graph may or may not include personally identifiable information about people related to the person 104. For example, a truncated graph may include attributes relating to persons 106 and 114 but may not identify those people by name. In other cases, the persons 106 and 114 may be identified by name.

Characteristics of people for whom no permission has been granted may be obfuscated in some manner. In some cases, the characteristics of such people may be aggregated or summarized. As an example, one such representation may include a social graph that includes all of the persons in embodiment 100 having a heavy circle, namely persons 104, 106, 108, 110, 114, and 116. For all of the other persons, a summarized set of characteristics may be included.

In some cases, salting or randomization may be used to obfuscate data that may represent people for whom no permission had been received. For example, a truncated social graph may include false nodes that contain random or falsified data. Such examples may not identify which nodes are false and which are real. In another example, salted or false data may be added to a group of nodes that may be aggregated together. Such a process may obfuscate the real data, thereby protecting the data.

Some truncated social graphs may include a notion of relationship strength. Many people may have relationships with various characteristics as well as various people, but the relationship may vary in strength. Some relationships may be very strong, and as such the characteristics of the relationship may be assumed to transfer to the person 104. Relationships that may be very weak may have much less effect on the person 104.

Figure 2:
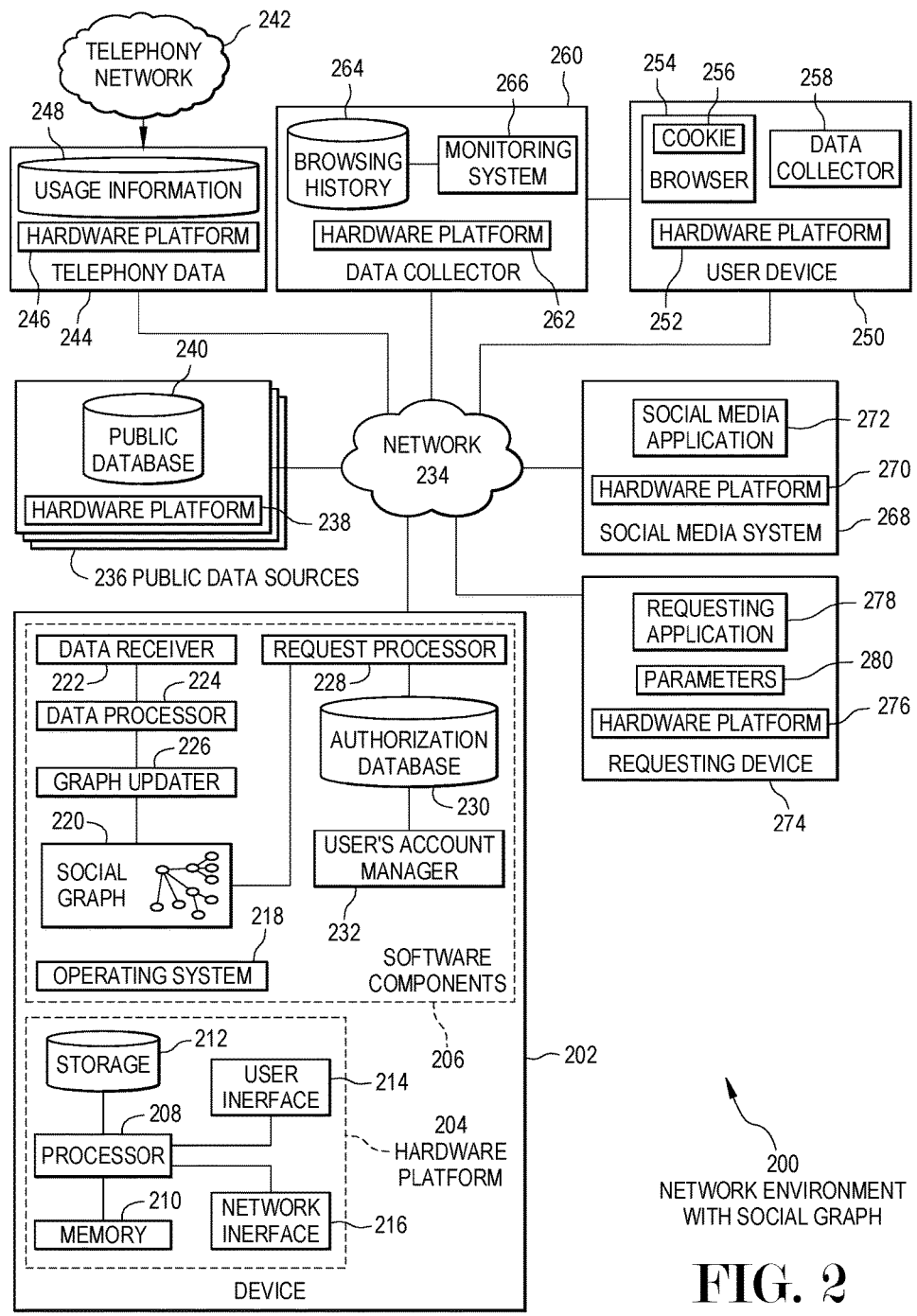
FIG. 2 is a diagram illustration of an embodiment showing a network environment for generating a social graph and truncated versions of the social graph.

FIG. 2 is a diagram of an embodiment 200 showing components that may create a social graph, then generate truncated social graphs from third party requests. Embodiment 200 is merely one example of an architecture for implementing such a system.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

A social graph 220 may be a construct that may represent people, objects, places, companies, brands, interests, and many other objects and their relationships to each other. The social graph 220 may be constructed in many different ways and using many different data sources, and many implementations may include persons and their relationships to each other as well as other objects.

The precise data structure for the social graph 220 may vary from one implementation to another, and may reflect the design of the underlying data. For example, some social graphs may be constructed using portions of a person's browsing history and may have one data structure, while a different social graph may be constructed from inter-personal relationships identified by the participants, as well as employment and professional history.

A data receiver 222 may collect data from various sources to create the social graph 220. A data processor 224 and graph updater 226 may perform various processing of the data, such as verification, formatting, and other processing, then may determine how to add the data to the social graph 220. In many cases, the social graph 220 may be continually updating, as new data may identify new nodes and edges that may be added to the social graph 220, relationships within the graph that may be strengthened or weakened, or portions of the graph that may be out of date and may be removed.

A request processor 228 may receive incoming requests for truncated social graphs. The request processor 228 may verify a requestor's permissions to receive the results through an authorization data base 230. The requestor may manage their account using a user's account manager 232.

The request processor 228 may receive a request for a truncated social graph, then access the social graph 220 and generate a truncated social graph that meets the request. The truncated social graph may be transmitted to the requestor.

A typical request for a truncated social graph may include a starting point, which may typically be a person of interest, as well as a set of parameters relating to the person. The set of parameters may change from one use case to another. For example, a health insurance company may be interested in a person's affinity or participation in various physical activities and other risk factors that may affect the person's health and wellbeing. In another example, a real estate professional may wish to get a truncated social graph for a potential customer to determine which housing option to recommend for a person. Such a truncated social graph may include many location-based objects, such as the person's work location, the location of the person's family members, and locations of their favorite restaurants and other brands.

The device 202 may be connected by a network 234 to various other devices and systems.

A set of public data sources 236 may be any source of data that may be used to construct or augment a social graph 220. The public data sources 236 may operate on a hardware platform 238 and may contain a public database 240. A data receiver 222 may query the public database 240 to receive data that may be incorporated into the social graph 220.

The set of public data sources 236 may be any source of data that may be publically available. Such information may include data provided by government agencies, as well as data available from private sources. In some cases, the data may be available through paid service while in other cases, the data may be available free of charge.

A telephony network 242 may provide some data for a social graph 220. The telephony network 242 may represent any communication network provider, which may include wired and wireless telephony, wired and wireless data connections, or any other communications network. The data may be consumed through a telephony data service 244, which may have a hardware platform 246 which may serve usage information 248.

The usage information 248 may include any data that may be collected from a communications network. Such information may include metadata about connections, such as locations of a user at specific times, which may be gathered from cellular telephone handoffs and connections. In some cases, a person's mobile device may have Global Positioning System (GPS) coordinates that may be transmitted to a network service provider on occasion, which may help determine a person's location.

The usage information 248 may also include connection metadata, such as to whom a user may converse using voice, SMS or text messaging, or other communication mechanism. The connection metadata may include duration, frequency, time of day, and other information. In some cases, the connection metadata may include application usage information, which may include browsing history.

Yet another source of data for a social graph 220 may include monitoring techniques that may be employed with web browsers. A user device 250 may have a hardware platform 252 on which a browser 254 may operate. A tracking cookie 256 may be placed by a website that a user may visit, and the tracking cookie 256 may be identified by the same or other websites to determine where a user may have browsed. In some cases, a separate application may also be installed that may be a data collector 258, which may provide usage information about the device.

A data collector 260 may have a hardware platform 262 on which a user's browsing history 264 may be stored. A monitoring system 266 may identify websites that have been browsed using the tracking cookie 256, and may log the activity in the browsing history 264. The data receiver 222 may periodically query the browsing history 264 and may use browsing history data to construct or augment the social graph 220.

A social media system 268 may operate on a hardware platform 270 and may operate a social media application 272. The social media application 272 may have connections between users, which may identify connections between people. Some social media applications may have two-way connections, where both people may consent to the relationship, while other social media applications may have one-way connections, where one person may "follow" or connect with another person, but the second person may not approve or even know that the connection exists.

Many social media systems 268 may make some or all of their data available to third parties. Such data may be consumed by a data receiver 222, which may use such data to create or augment the social graph 220.

A requesting device 274 may be a device used by a requestor to order a truncated social graph. The device 274 may operate on a hardware platform 276, which may have a requesting application 278. In some cases, the requesting application 278 may request and receive truncated social graphs in a fully automated manner, where the request processor 228 may be an application programming interface (API) or other service that may be accessed programmatically. In other cases, the requesting application 278 may be a manual or semi-manual interface where a person may request a truncated social graph. In many cases, a request may include various parameters 280 that may define the type of graph and parameters of interest for the requested graph.

Figure 3:
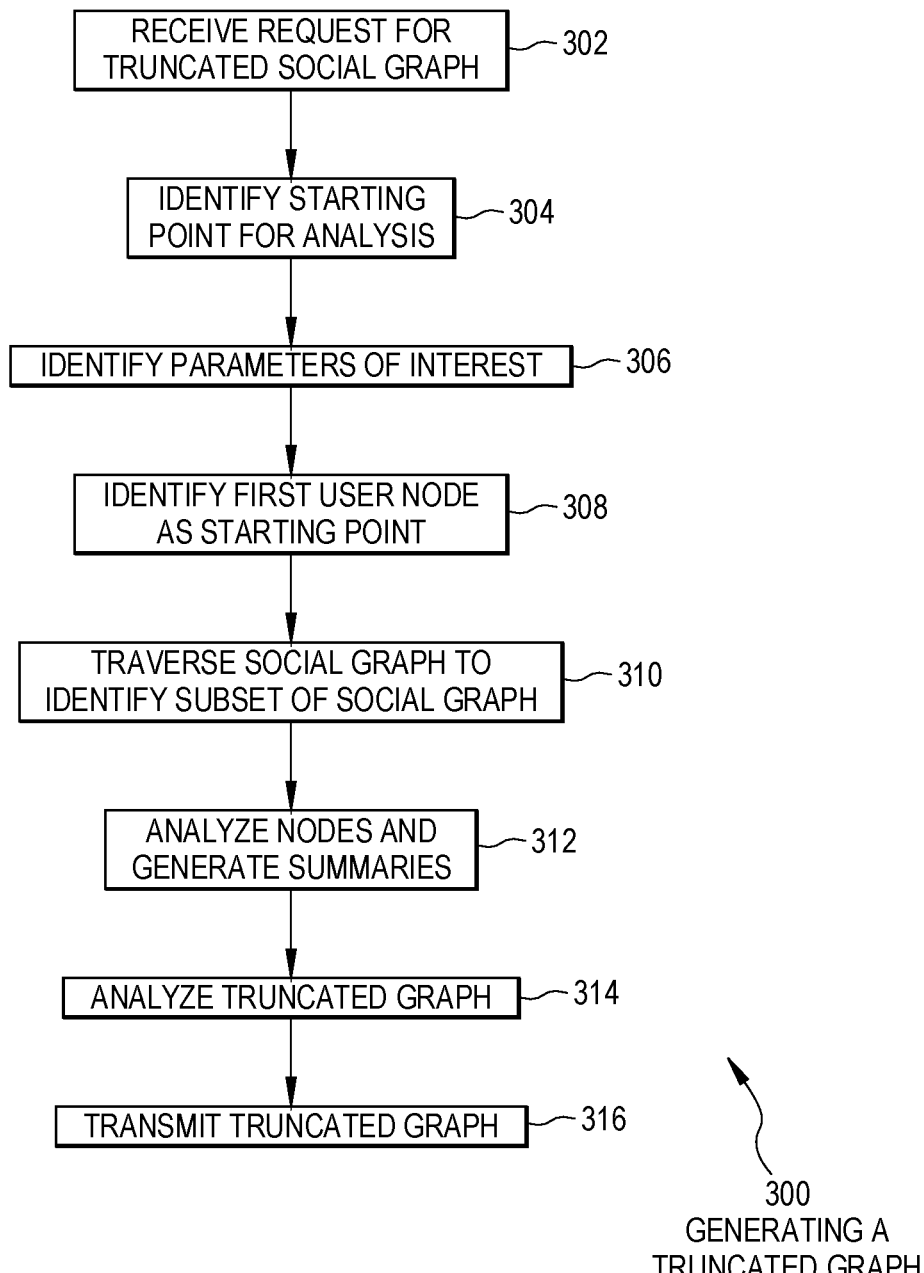
FIG. 3 is a flowchart illustration of an embodiment showing a method for generating a truncated social graph.

FIG. 3 is a flowchart illustration of an embodiment 300 showing a method of generating a truncated graph. Embodiment 300 is a simplified example of a sequence for receiving a request, traversing a larger social graph, and building a truncated graph.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 300 is merely one example of how a system may create truncated social graphs that may be used in various scenarios. A system may have a larger social graph that may identify people and various characteristics of those people, as well as relationships between different people and characteristics of those relationships.

In many cases, the larger social graph may contain information that may be private in some manner. In some cases, information in a large social graph may contain personally identifiable information that may be collected by systems, but are considered private by law or custom. Such information may be legally collected when permission has been given by the person who might be tracked.

In other cases, a larger social graph may contain information that may be proprietary to the entity that creates or manages the larger social graph. Such information may be purchased from third parties and aggregated into the larger social graph, may be inferred or calculated from other data, or may be generated in some other manner.

A truncated social graph may be a subset of a larger social graph in terms of the relationships contained in the truncated social graph, and in many cases, may also have a subset of the data contained in the larger social graph. The subset of data may be tailored for a particular use case. For example, an insurance company may request a truncated social graph for an insured and may request various risk factors of interest to the insurance company. Other data fields that may be present in the larger social graph may not be included in the truncated social graph requested by the insurance company.

A request may be received in block 302 for a truncated social graph. The request may identify a starting point for analysis in block 304, as well as the parameters of interest in block 306.

A first user node may be identified in block 308, and the larger social graph may be traversed in block 310 to identify a subset of the social graph.

A truncated social graph may be generated by traversing a larger social graph to identify related persons or other nodes in the larger social graph. The traversal may vary from one situation to another. In some situations, the traversal may be limited to a set number of relationships away from the starting node. For example, a truncated social graph may be generated by identifying all of the nodes within two, three, four, five, or some other pre-determined number of relationships from the starting node.

In some cases, the larger social graph may be traversed to identify a pre-defined number of related nodes, or may identify a minimum or maximum number of related nodes.

Some systems may traverse the larger social graph to find a minimum or maximum number of nodes of a certain type or having certain characteristics. For example, a query may identify nodes that relate to the query and may traverse the larger social graph to find a certain number of nodes that relate to the query.

Once the nodes have been identified in block 310, the nodes may be analyzed and summarized in block 312. The analysis and summarization may include anonymizing nodes for which permission has not been given, salting the truncated graph with random data, summarizing nodes outside the scope of the traversal, summarizing nodes within the traversal where permission has not been given, or other analysis.

Analysis of the truncated graph may be performed in block 314, where summarized statistics may be generated or other analysis may be performed. The analysis may vary from one type of query to another. The finalized truncated graph may be transmitted in block 316 to the requestor.

Figure 4:
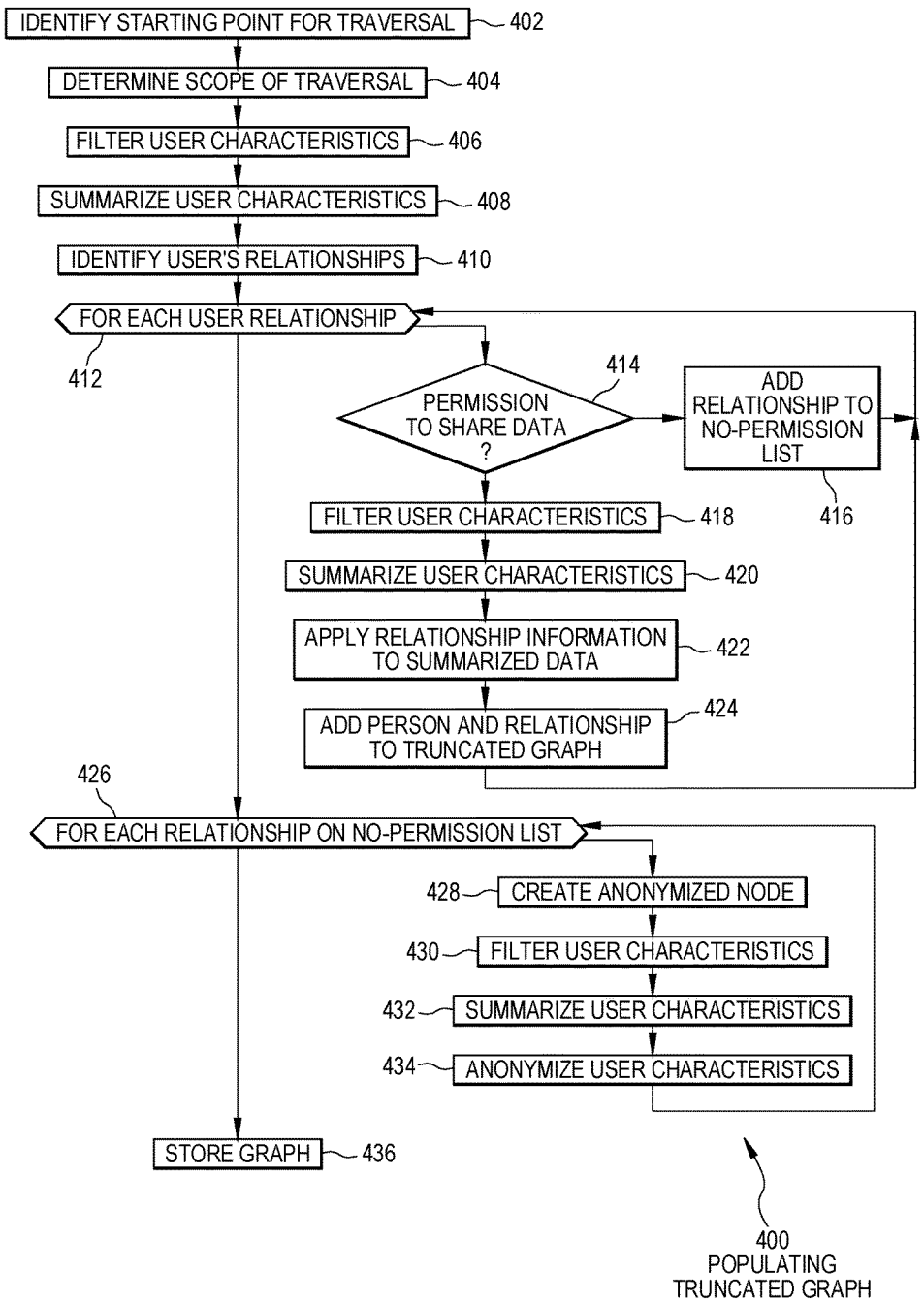
FIG. 4 is a flowchart illustration of an embodiment showing a method for generating a truncated social graph with nodes for which permission has and has not been given.

FIG. 4 is a flowchart illustration of an embodiment 400 showing a method of populating a truncated graph. Embodiment 400 is a simplified example of a sequence for traversing a larger social graph and generating a truncated social graph where some of the nodes are restricted and other nodes are not. The restriction may be permission settings, where a person represented by a node may have given permission for their data to be shared in a truncated graph.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 400 illustrates one method for populating a truncated graph. The method illustrates how some nodes may be handled differently based on the permissions given by people represented by the node.

In many systems, a person's data may be collected based on their usage of a system. For example, a mobile telephone service provider may collect usage data for their subscribers, yet each subscriber may or may not grant permission for the service provider to share data with third parties. In some cases, such permission may be a blanket permission granted for an unlimited number of truncated graph queries. In other cases, such permission may be granted on a case-by-case basis.

In block 402, a starting point for traversing a large social graph may be identified. The scope of the traversal may be identified in block 404. The scope of traversal may be a set of conditions or parameters by which the approximate size of a truncated graph may be defined. In some cases, such a condition may be a maximum or minimum number of nodes in a truncated graph, a maximum or minimum number of generations or links from the source node to any other nodes, a specific type of node or node characteristic of interest, or other definition for a traversal.

A set of user characteristics may be filtered in block 406. The user characteristics may be parameters of interest for a particular truncated graph. In many cases, a truncated graph request may include parameters of interest for the recipient, and other parameters may be filtered out of the truncated graph. The user characteristics for the starting person of the truncated graph may be summarized in block 408.

From the larger social graph, the relationships of the starting user may be identified in block 410. The larger social graph may be traversed to identify those relationships, as well as second, third, fourth, and further relationships from the starting node.

For each user relationship in block 412, a determination may be made in block 414 as to whether permission is granted to share the data. When no permission is granted in block 414, the relationship may be added to a no-permission list in block 416. When permission is granted in block 414, the user characteristics of the person may be filtered in block 418 and summarized in block 420.

The relationship of the user may be identified in block 422 and added to the summarized data, and the person and relationship may be added to the truncated graph in block 424.

For each relationship for which no permission has been granted in block 426, an anonymized node may be created in the truncated graph in block 428. The user characteristics may be filtered in block 430, summarized in block 432, and anonymized in block 434. The graph may be stored in block 436.

Figure 5:
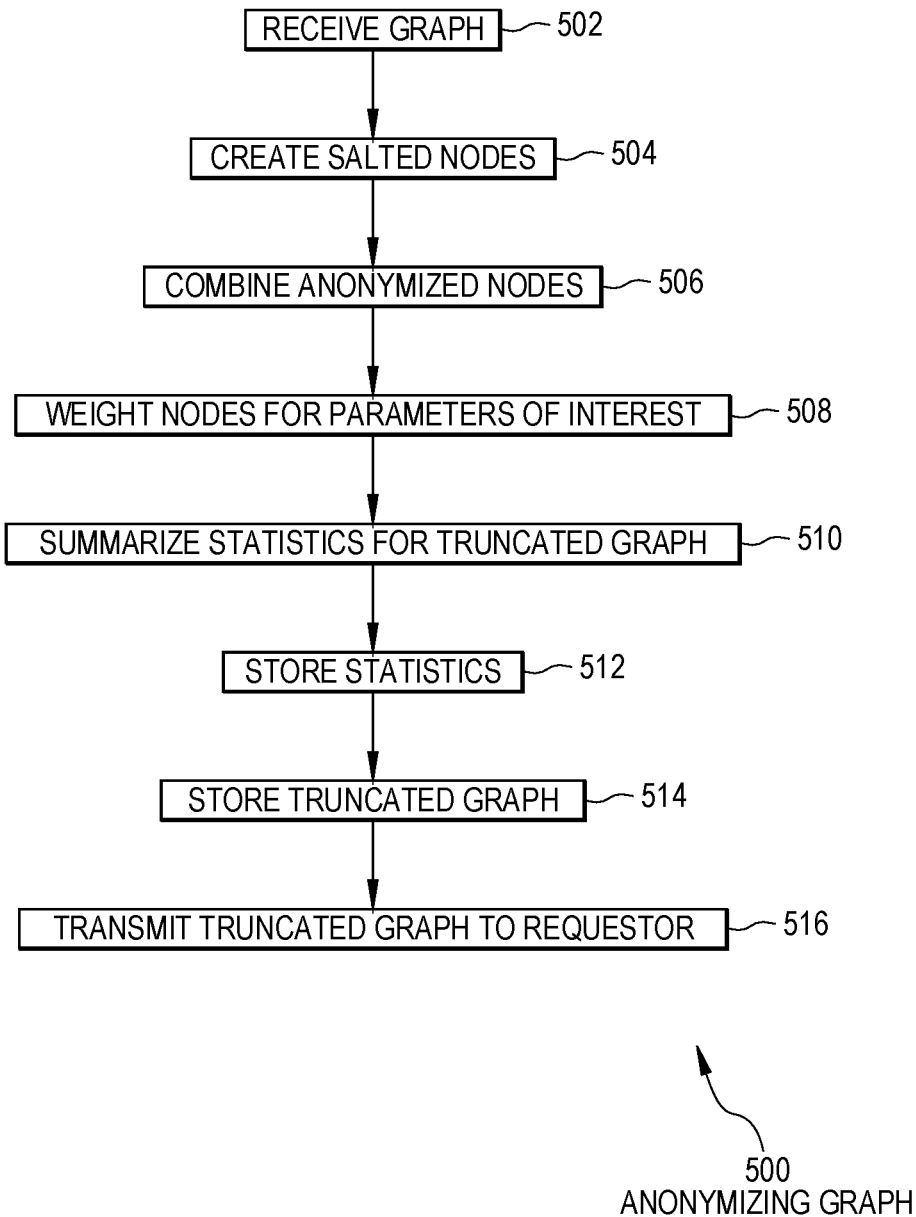
FIG. 5 is a flowchart illustration of an embodiment showing a method for analyzing and anonymizing a truncated social graph.

FIG. 5 is a flowchart illustration of an embodiment 500 showing a method of finalizing and anonymizing a truncated graph. Embodiment 400 is a simplified example of a sequence for anonymizing a graph as well as generating summary statistics of the truncated graph prior to sending the truncated graph to a requestor.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

A truncated graph may be received in block 502.

Salted nodes may be created in block 504. A salted node may be a false node that may appear to be real. A salted node may be used to anonymize data so that nodes for which no permission has been given cannot be deciphered.

For example, a person may have four siblings. In a truncated graph for the person, three of the siblings may have given permission while the fourth may not have given permission for their data to be used in a truncated graph. If three of the four siblings have their information identified in the truncated graph, the fourth sibling's information may be identifiable even if it was "anonymized". By including a similar but false node, the recipient may not be able to determine which node is false or salted, and which node may be truthful. In such a manner, salting the graph with false information may help to anonymize or protect users that do not wish their data to be shared.

Another manner for anonymizing nodes may be to combine anonymized nodes in block 506. By combining anonymized nodes, several people's information may be combined into a single node, which may or may not be represented as a single person or group of people.

The nodes may be weighted based on parameters of interest in block 508. Such a weighting or analysis may scan the truncated social graph and may identify which nodes and relationships are more relevant for the requestor, and may apply weighting factors to the parameters of interest. The weighting may remove nodes in some cases, such as where the node may be superfluous to the query.

A set of summarized statistics may be generated for the truncated graph in block 510. In some cases, a requesting system may be able to process summary statistics easier than a graph with nodes and edges, also, in some cases, summary statistics may be grasped and comprehended easier by human reviewers than a truncated graph.

The statistics may be stored in block 512, along with the truncated graph in block 514. The truncated graph may be transmitted in block 516 to the requestor.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principals of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by at least one computer processor, said method comprising:

receiving a request for a truncated social graph, said truncated social graph comprising anonymized nodes and non-anonymized nodes and being a subset of a large social graph, said request comprising an identifier for a first person;

identifying a first user node within said large social graph, said first user node representing said first person within said large social graph, said large social graph comprising relationships between said first user and a plurality of other nodes, said plurality of other nodes having a permission setting;

traversing said large social graph to identify a first set of nodes having a first set of relationships to said first user node where sharing permission is granted and a second set of nodes having a second set of relationships to said first user node where sharing permission is not granted;

for each of said second set of nodes, creating a set of anonymized nodes, wherein the creating the set of anonymized nodes comprises aggregating a plurality of nodes and edges;

and wherein the creating the set of anonymized nodes further comprises creating a set of randomized nodes and edges and aggregating said plurality of nodes and edges with said set of randomized nodes and edges;

and wherein said set of randomized nodes and edges comprises adding false data to protect user nodes for which sharing permissions have not been granted;

creating said truncated social graph comprising said first set of nodes and said set of anonymized nodes; and transmitting said truncated social graph.

2. The method of claim 1, said permission for a first node being permission granted by a person having a relationship to said first node.

3. The method of claim 2, said person being said first person.

4. The method of claim 2, said person being a person other than said first person.

5. The method of claim 1, said large social graph comprising:
   attribute nodes comprising descriptors; and
   object nodes comprising at least one of a group composed of: persons, places, things, brands, communities, and groups.

6. The method of claim 5, said large social graph further comprising edges defining relationship strengths between nodes of said large social graph.

7. A system comprising:
   a hardware processor;
   a memory communicatively coupled to the hardware processor, the memory having stored thereon:
   a first database comprising social relationships between users; a query system that: receives a request for a truncated social graph, said request comprising an identifier for a first person, said truncated social graph being a subset of a large social graph;
   derives said large social graph from said first database comprising social relationships between users; identifies a first user node within a large social graph, said first user node representing said first person within said large social graph, said large social graph comprising relationships between said first user and a plurality of other nodes, said plurality of other nodes having a permission setting; traverses said large social graph to identify a first set of nodes where sharing permission is granted and a second set of nodes where sharing permission is not granted;
   for each of said second set of nodes, creates a set of anonymized nodes,
   wherein said creation of said set of anonymized nodes comprises aggregating a plurality of nodes and edges;
   and wherein said creation of said set of anonymized nodes further comprises creating a set of randomized nodes and edges, and aggregating said plurality of nodes and edges with said set of randomized nodes and edges;
   and wherein said set of randomized nodes and edges comprises adding false data to protect user nodes for which sharing permissions have not been granted;
   creates a truncated social graph comprising said first set of nodes and said set of anonymized nodes, said first set of nodes being non-anonymized nodes;
   and transmits said truncated social graph.

8. The system of claim 7, said large social graph being further derived from at least one secondary database comprising a plurality of attributes associated with at least one node derived from said first database.

9. The system of claim 8, said first database comprising implied social relationships derived from location information associated with said first person and a second person.

10. The system of claim 9, said permission for a first node being permission granted by a person having a relationship to said first node.

11. The system of claim 10, said person being said first person.

12. The system of claim 10, said person being a person other than said first person.

13. The system of claim 7, said large social graph comprising:
   attribute nodes comprising descriptors; and
   object nodes comprising at least one of a group composed of: persons, places, things, brands, communities, and groups.

14. The system of claim 7, said large social graph further comprising edges defining relationship strengths between nodes of said large social graph.

* * * * *